United States Patent [19]

Matsumoto et al.

[11] Patent Number: 4,615,930
[45] Date of Patent: Oct. 7, 1986

[54] MAGNETIC RECORDING MEDIA HAVING AN UNDERCOAT AS ISLANDS

[75] Inventors: Yukio Matsumoto; Hirokazu Moriizumi, both of Mito, Japan

[73] Assignee: Victor Company of Japan, Limited, Japan

[21] Appl. No.: 605,674

[22] Filed: Apr. 27, 1984

[30] Foreign Application Priority Data

Apr. 30, 1983 [JP] Japan .................................. 58-77125

[51] Int. Cl.⁴ ............................................... G11B 5/72
[52] U.S. Cl. ..................................... 428/142; 360/134;
360/135; 360/136; 427/131; 427/128; 428/323;
428/328; 428/336; 428/423.7; 428/473.5;
428/474.4; 428/475.2; 428/480; 428/694;
428/900; 428/910
[58] Field of Search ............... 428/694, 695, 900, 480,
428/423.7, 910, 328, 336, 473.5, 474.4, 475.2,
323, 142, 141; 427/41, 131, 128; 360/134–136

[56] References Cited

U.S. PATENT DOCUMENTS

| 4,153,920 | 5/1979 | Shinahata | 427/131 |
| 4,183,976 | 1/1980 | Yamada | 427/131 |
| 4,348,446 | 9/1982 | Mitsuishi | 428/148 |
| 4,364,885 | 12/1982 | Kanai | 428/694 |
| 4,489,117 | 12/1984 | Ono | 428/694 |
| 4,528,240 | 7/1985 | Miyoshi | 428/694 |
| 4,539,265 | 9/1982 | Yazawa | 428/694 |
| 4,540,618 | 9/1985 | Suzuki | 428/694 |

FOREIGN PATENT DOCUMENTS 3213352  11/1982  Fed. Rep. of Germany .

Primary Examiner—Ellis P. Robinson
Attorney, Agent, or Firm—Lowe, Price, Leblanc, Becker & Shur

[57] ABSTRACT

A magnetic recording medium comprising a non-magnetic resin support, and a magnetic layer form on the support. A polyester or polyurethane resin undercoat is formed between the support and the magnetic layer in the form of islands which are isolated from one another.

6 Claims, 2 Drawing Figures

MAGNETIC RECORDING MEDIA HAVING AN UNDERCOAT AS ISLANDS

BACKGROUND OF THE INVENTION

1. Field of the Invention

This invention relates to magnetic recording and more particularly, to magnetic recording media of the type which are much improved in adhesion between support and magnetic layer with improved durability of the magnetic layer without a sacrifice of other desirable properties.

2. Description of the Prior Art

In magnetic recording media such as magnetic tapes and discs in which the magnetic layer is formed by coating, one of problems to solve is an improvement of adhesion of the magnetic layer to a support. For this purpose, there was proposed a recording medium which comprises a non-magnetic polyamide support and an undercoat layer of polyurethane elastomer formed on the support. A magnetic layer is formed on the undercoat layer. In this medium, the polyurethane elastomer layer is provided between the polyamide film and the magnetic layer, by which it is intended to improve adhesion between the polyamide film and the magnetic layer through the undercoat layer. Although the adhesion strength is improved to some extent and occurrence of dropouts is also prevented to some extent, chrominance signal S/N becomes poorer than in the case where no undercoat layer is formed. Thus, formation of the undercoat layer of polyurethane elastomer is not necessarily satisfactory.

SUMMARY OF THE INVENTION

It is accordingly an object of the present invention to provide magnetic recording media which are much improved in adhesion of a magnetic recording layer to a support without lowering the chrominance signal S/N whereby the magnetic recording layer has improved durability.

It is another object of the invention to provide magnetic recording media which involve little dropouts upon reproduction of signal information and which do not substantially soil magnetic heads or drums.

It is a specific object of the invention to provide magnetic recording media whose support is made of a resin composition comprising titanium oxide particles whereby smoothness and travelling performance as required in magnetic recording media can be remarkably improved.

In order to achieve the above objects, there is provided, according to the invention, a magnetic recording medium which comprises a non-magnetic resin support, a polyester or polyurethane resin undercoat formed on one surface of the non-magnetic support as islands, and a magnetic layer formed on the islands-bearing support. The term "islands" is intended to mean portions of an undercoat which are not continuous but are isolated or separated from one another. In a preferred embodiment, the support is made of a resin composition which comprises a thermoplastic resin and 0.03 to 10 wt% of titanium oxide particles and is in the form of a film or sheet. By this, the durability of the magnetic layer are further improved with improved smoothness and travelling performance of the magnetic recording medium.

BRIEF DESCRIPTION OF THE INVENTION

FIG. 1 is a schematic plan view of part of a support on which an undercoat is formed as islands; and
FIG. 2 is a schematic sectional view of the support on which resin islands are formed.

DETAILED DESCRIPTION AND PREFERRED EMBODIMENTS OF THE INVENTION

The present invention is characterized in that an undercoat in the form of islands is present between a non-magnetic resin support and a magnetic recording layer. This is particularly shown in FIGS. 1 and 2 in which there is shown a sheet S including a support 10 on which islands 12 are distributed as shown. Indicated at 14 are irregularities of the support. From the figures, it will be appreciated that the islands 12 are very thin and rather small. The manner of forming resin islands 12 on the support 10 is described.

Figure 1:
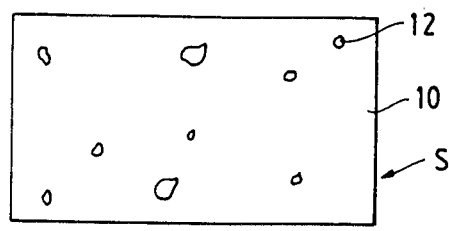
Figure 2:
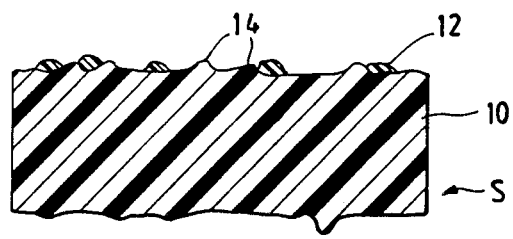

A solution of a polyester or polyurethane resin is prepared by dissolving it in water if water-soluble resin is used or in organic solvents such as ethyl acetate, methyl ethyl ketone, toluene or the like. The solution is applied onto a resin support, preferably a film or sheet, in a thickness of 0.01 to 1.0 μm on the dry basis. The resin-bearing support is subsequently stretched uniaxially or biaxially to a draw ratio of 2 to 10, preferably 3 to 8. Upon the stretching, the coated polymer resin layer is not stretched, leaving the resin in the form of islands as shown in FIG. 1. The size and manner of distribution of the islands may, of course, vary depending largely on the draw ratio. The support may be uniaxially stretched in a lengthwise or lateral direction provided that islands of the undercoat are suitably formed.

Polyester and polyurethane resins suitable for the purpose of the invention may be soluble in water. Water-soluble polyester resins are commercially available from Toyobo Co., Ltd. under the name of Bironal MT-1200 or MT-1530. Likewise, water-soluble polyurethane resins are commercially available from Dainippon Ink and Chemicals Inc., under the name of HYDRAN HW-111, HW-312 or HC-200. These water-soluble polymers may be used by dissolving in organic solvents as mentioned before. Alternatively, other types of polyesters or polyurethanes which are sparingly soluble in water may be used by dissolving in organic solvents.

The solution may be coated by any known coating techniques such as spraying, roll coating, and the like on the ground that the afore-defined range of dry thickness is attained. The solution of the polyurethane or polyester may further comprise additives such as levelling agents, inorganic pigments, abrasives and the like in amounts not impeding the effect of the polymer.

Materials for the support useful for these purposes are, for example, polyesters, polyamides, polyimides and the like which have good affinity for the polyesters or polyurethanes used as the undercoat.

A magnetic recording layer is formed on the islands-bearing surface as usual. The magnetic recording layer may be made of any known magnetic resin compositions comprising magnetic particles and resin binders. Useful magnetic materials are, for example, ferromagnetic iron oxides such as gamma-$Fe_2O_3$ and $Fe_3O_4$ with or without additional metals such as Co, Ni, Mn and the like, ferromagnetic metals such as Fe, Co, Ni, and alloys thereof. Additional metals such as Al, Cr, Mn, Cu and the like may be added to the metals or alloys.

Binders for these magnetic materials may be any known thermoplastic resins, thermosetting resin, and mixtures thereof ordinarily used for these purposes.

Dispersions of magnetic particles in resin binders dissolved in solvent may be applied onto the islands-bearing support by a usual manner, thereby forming a magnetic layer on the support.

In order to further improve the magnetic recording media of the invention, it is preferred that the resin support is formed of resin compositions which comprise thermoplastic resins such as polyesters, polyamides, polyimides and the like and titanium oxide particles with an average size below 2.5 $\mu$m, preferably from 0.05 to 1.0 $\mu$m, and most preferably from 0.05 to 0.5 $\mu$m. The titanium oxide particles are used in an amount of 0.03 to 10 wt% of the resin composition. Titanium oxides used herein include titanium monoxide, titanium dioxide and dititanium trioxide. By incorporating the titanium oxide particles in the support, the resulting magnetic recording media have improved travelling performance and smoothness. The durability of the magnetic layer is further improved. In short, the recording media according to the preferred embodiment of the invention have much improved durability, wear resistance, travelling performance and electromagnetic characteristics.

The present invention is described in more detail by way of examples.

Six base films and three magnetic paints used in examples and comparative examples were made as follows.

Base Film A

A 15 $\mu$m thick polyester film was made by casting and sprayed thereon with an aqueous polyurethane solution, followed by drying and uniaxially stretching in the lengthwise direction, thereby obtaining base film A with resin islands thereon.

Base Film B

The procedure of "Base Film A" was repeated except that about 1 wt% of titanium dioxide particles with an average size of 0.1 to 0.3 $\mu$m were contained in the base film, thereby obtaining base film B with resin islands thereon.

Base Film C

The procedure of "Base Film A" was repeated except that a water-soluble polyester resin was used and about 8 wt% of titanium dioxide with an average size of from 0.3 to 0.8 $\mu$m, thereby obtaining base film C with resin islands thereon.

Base Film D

An undercoat layer of water-soluble polyurethane was formed on a 15 $\mu$m thick polyester film in a dry thickness of 0.5 $\mu$m, thereby obtaining base film D.

Base Film E

A resin composition comprising a polyester and 5 wt% of calcium carbonate particles with an average size of 0.5 to 2.5 $\mu$m was cast to obtain a 15 $\mu$m thick base film.

Base Film F

A polyester base film was formed with a back coat layer made of carbon black-containing nitro cellulose in a dry thickness of 0.5 $\mu$m.

Magnetic Paint A

One hundred parts by weight of magnetic gamma-$Fe_2O_3$ powder, 15 parts by weight of vinyl chloride-vinyl acetate copolymer, 15 parts by weight of butyl polyacrylate, 1 part by weight of lecithin, 6.5 parts by weight of carbon black, 2 parts by weight of oleic acid, 150 parts by weight of toluene, and 150 parts by weight of methyl ethyl ketone were sufficiently mixed in a sand mill.

Magnetic Paint B

One hundred parts by weight of magnetic Co-containing $Fe_2O_3$ powder, 13 parts by weight of nitro cellulose, 23 parts by weight of polyether-type polyurethane prepolymer, 1 part by weight of lecithin, 6.5 parts by weight of carbon black, 2 parts by weight of oleic acid, 140 parts by weight of toluene, and 140 parts by weight of methyl ethyl ketone were sufficiently mixed in a sand mill.

Magnetic Paint C

One hundred parts by weight of magnetic Fe—Co—Ni alloy powder, 20 parts by weight of butyl acrylate-acrylonitrile copolymer, 10 parts by weight of vinyl chloride-vinyl acetate copolymer, 1 part by weight of lecithin, 6.5 parts by weight of carbon black, 150 parts by weight of butyl acetate, and 150 parts by weight of methyl ethyl ketone were mixed in a sand mill.

EXAMPLE 1

To the magnetic paint (A) was added 15 parts by weight of polyisocyanate (coronate L). The mixture was applied onto base film A and dried, followed by calendering and slitting into $\frac{1}{2}$ inch wide magnetic tapes for video tape recorder.

EXAMPLES 2–5

The procedure of Example 1 was repeated using base film B and magnetic pain A (Example 2), base film C and magnetic paint A (Example 3), base film B and magnetic paint B (Example 4), and base film C and magnetic paint C (Example 5), thereby obtaining magnetic tapes for video tape recorder.

COMPARATIVE EXAMPLES 1–5

The general procedure of Example 1 was repeated using base film D and magnetic paint A (Comparative Example 1), base film E and magnetic paint A (Comparative Example 2), base film E and magnetic paint B (Comparative Example 3), base film E and magnetic paint C (Comparative Example 4), and base film F and magnetic paint A (Comparative Example 5), thereby obtaining magnetic tapes for video tape recorder.

The magnetic tapes obtained in these examples and comparative examples were subjected to measurements of peeling strength of the magnetic layer, the number of dropouts generated, variation of audio output level, and state of cut edges. The results are shown in Table 1 below.

TABLE 1

| | Peeling Strength (g/cm$^2$) | Dropouts per Min. | Level Variation (dB) | State of Cut Edges |
|---|---|---|---|---|
| Example | | | | |
| 1 | 56 | 35 | 0.4 | good |

TABLE 1-continued

| | Peeling Strength (g/cm²) | Dropouts per Min. | Level Variation (dB) | State of Cut Edges |
|---|---|---|---|---|
| 2 | 65 | 30 | 0.4 | good |
| 3 | 58 | 32 | 0.6 | good |
| 4 | 56 | 39 | 0.3 | good |
| 5 | 55 | 36 | 0.5 | good |
| Comparative Example | | | | |
| 1 | 30 | 60 | 0.8 | good |
| 2 | 15 | 80 | 1.0 | fair-poor |
| 3 | 10 | 86 | 1.5 | poor |
| 4 | 13 | 90 | 1.3 | poor |
| 5 | 8 | 35 | 1.4 | poor |

The peeling strength was determined using a TOM tensile tester and expressed in terms of a force required for peeling the magnetic layer from the support.

The dropout was determined using a video cassette recorder HR-7200 (PAL) made by Victor Company of Japan, Limited as a level of −20 dB continuing for 5 microseconds.

The audio output level variation was measured using a signal of 7 KHz from a video cassette recorder HR-7650 made by Victor Company of Japan, Limited.

The state of the cut edges were determined by observing a degree of scaling or dusting at the edges by an optical microscope.

Moreover, the respective magnetic tapes were further subjected to measurements of video modulation noise, average surface roughness, Ra, and coefficient of friction and degree of abrasion of the base film after 200 reproduction cycles. The results are shown in Table 2 below.

TABLE 2

| | Modulation Noise (dB) | Average Surface Roughness (μm) | After 200 Reproduction Cycles | |
|---|---|---|---|---|
| | | | Coefficient of Friction | Degree of Abrasion |
| Example | | | | |
| 1 | −45.8 | 0.011 | 0.17 | some defects |
| 2 | −45.8 | 0.010 | 0.11 | no defect |
| 3 | −45.3 | 0.012 | 0.10 | " |
| 4 | −45.9 | 0.009 | 0.13 | " |
| 5 | −46.8 | 0.007 | 0.12 | " |
| Comparative Example | | | | |
| 1 | −37.3 | 0.039 | 0.27 | many defects |
| 2 | −39.1 | 0.024 | 0.18 | " |
| 3 | −38.8 | 0.026 | 0.20 | " |
| 4 | −40.0 | 0.021 | 0.20 | " |
| 5 | −44.9 | 0.038 | 0.23 | no defect |

The modulation noise was determined as follows: a spectrum analyzer was used to measure a noise level at a frequency lower by 100 KHz than a carrier frequency of 4 MHz when a signal of 4 MHz was reproduced.

The average surface roughness was determined under conditions of a measuring length of 2 mm and a cut-off length of 0.08 mm.

As will be seen from the results of Tables 1 and 2, the magnetic tapes of the invention are superior to those of the comparative examples with respect to adhesion strength, scaling or dusting and dropouts. This leads to better reproduction characteristics. The magnetic tapes of the invention are also better in smoothness, travelling performance and durability.

What is claimed is:

1. A magnetic recording medium which comprises a non-magnetic resin support, islands of a polyester or polyurethane resin undercoat layer formed on one surface of the non-magnetic support, and a magnetic layer formed on the islands-bearing resin support wherein said resin support is a film made of a resin composition comprising a thermoplastic resin and 0.3 to 10 wt% of titanium oxide particles having an average size below 2.5 μm, and wherein the islands are formed by coating the resin undercoat with a thickness of 0.01 to 1.0 μm on the resin support and stretching the resin support to a draw ratio of 2 to 10.

2. The magnetic recording medium according to claim 1, wherein said resin support is a film of a thermoplastic resin selected from the group consisting of polyesters, polyamides and polyimides.

3. The magnetic recording medium according to claim 1, wherein the average size is in the range of 0.05 to 1.0 μm.

4. The magnetic recording medium according to claim 1, wherein said thermoplastic resin is a polyester.

5. The magnetic recording medium according to claim 1, wherein said undercoat is made of a water-soluble polyester.

6. The magnetic recording medium according to claim 1, wherein said undercoat layer is made of a water-soluble polyurethane.

* * * * *